United States Patent [19]

Christianson

[11] Patent Number: 4,936,245
[45] Date of Patent: Jun. 26, 1990

[54] GRAIN GAGE

[76] Inventor: Glenes O. Christianson, P.O. Box 182, Spicer, Minn. 56288

[21] Appl. No.: 318,980

[22] Filed: Mar. 6, 1989

Related U.S. Application Data

[63] Continuation-in-part of Ser. No. 162,690, Feb. 29, 1988, abandoned.

[51] Int. Cl.[5] .............................................. G01F 23/00
[52] U.S. Cl. .................................. 116/227; 73/290 R; 73/323
[58] Field of Search ................ 73/290 R, 297, 323, 73/324; 116/227; 340/617; 222/23, 40, 155, 157, 159; 52/192

[56] References Cited

U.S. PATENT DOCUMENTS

| | | | |
|---|---|---|---|
| 461,372 | 10/1891 | Smith | 222/155 |
| 1,669,110 | 5/1928 | Wencel | 73/334 |
| 2,349,808 | 5/1944 | Benger | 73/297 |
| 2,702,475 | 2/1955 | Dougherty et al. | 73/290 R |
| 4,220,048 | 9/1980 | Grepiotis et al. | 73/323 |
| 4,524,618 | 6/1985 | Mullis | 73/323 |
| 4,527,714 | 7/1985 | Bowman | 73/290 R |

*Primary Examiner*—Allan N. Shoap
*Assistant Examiner*—Patrick R. Scanlon

[57] ABSTRACT

A device for determining when the material in a grain bin or similar container has reached a predetermined level of fullness. The device includes a transparent tube having feeding tubes in communication between the transparent tube and the interior of the bin. The upper feeding tube is open at a predetermined level which may be adjusted, and the lower tube may also be set to a desired lower level of grain in the bin. Both tubes slant at approximately 45 degrees to the horizontal.

5 Claims, 1 Drawing Sheet

GRAIN GAGE

BACKGROUND AND SUMMARY OF THE INVENTION

This application is a continuation in part of my previous application Ser. No. 07/162,690, filed Feb. 29, 1988 and now abandoned and pertains to gages and more particularly to a gage designed to indicate whether or not a material has reached a certain level in a container.

In many installations it is desirable to know whether or not the material held in a container has reached a certain level. In the storage of cereal or feed grains such as corn, soybeans, wheat or the like, it is usually not vital to know whether the bin is half full or one-third full, and yet it may be very important to know when the contents reach the level of fullness so that the bin will not overflow.

Most bins do not now have any gage or marker to indicate the level of the contents. However, if the bin if filled to overflowing, there can be a significant loss of material which will occur before the supply can be cut off. Therefore, some type of indicator to show when the level has reached a near-full level may be important.

By my device I provide an inexpensive but accurate and convenient gage which will give a clear visible indication as to the time at which the contents of the bin reach a certain level. That level will usually be at a nearly full mark, but is not limited to that level. It may also indicate a lower level as the bin is being emptied.

FIGURES

DESCRIPTION

Figure 1:
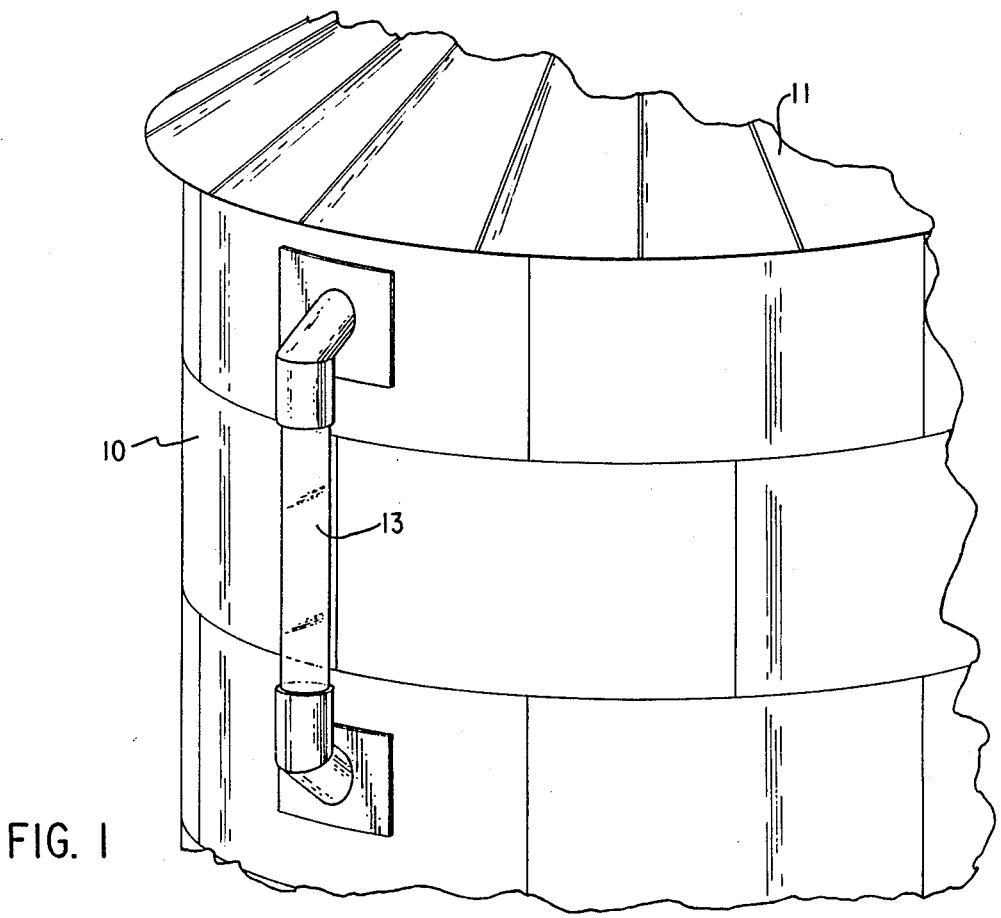
FIG. 1 is a partial elevational view of a bin with my device in place.
Figure 2:
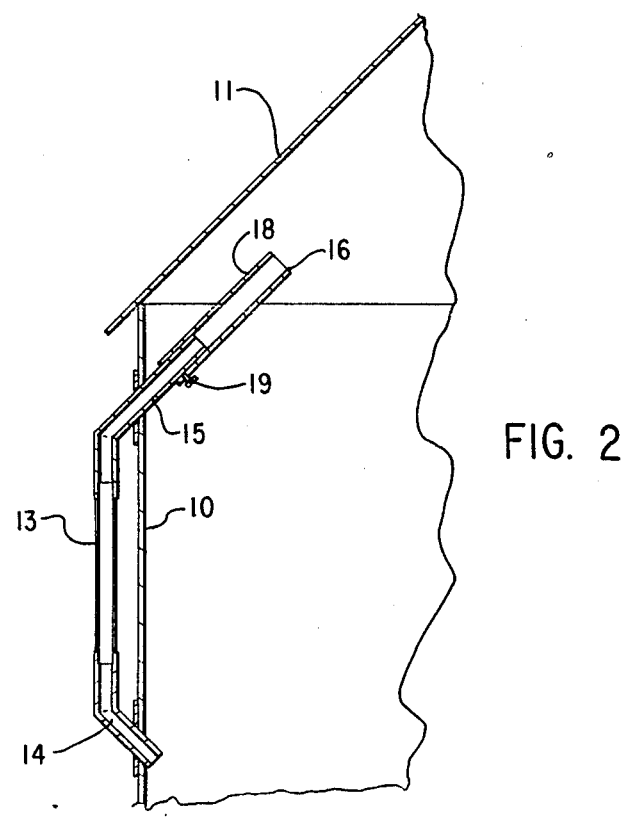
FIG. 2 is a longitudinal sectional view through my device and the bin to show interior parts.

Briefly my invention comprises a visual gage usable in a grain bin or the like, by which an observer may see when the contents reach a certain level while the bin is being filled. It may also be used to indicate a lower level being reached when the bin is emptying.

More specifically, my device is adapted to be used with a grain bin having sidewalls 10 and a roof 11. Although I have illustrated a circular bin, the device may also be used on any other shape, although the gaging may be somewhat more localized on another shape. The device is also adapted for use particularly on a bin which is filled from the center of the top of the bin.

The device consists of a transparent sight tube 13 made preferably of some clear and hard plastic material. The tube 13 is connected at its lower end to the bin by a tube 14 of about the same diameter as the sight tube 13. The lower connecting tube 14 is open to the interior of the bin.

An upper connecting tube 15 extends from the top of the sight tube 13 into the bin. The top lip 16 of this tube should be at the level at which the indicator is to be effective. Because the grain will not fill the tube from the bottom as a liquid would, the sight tube 13 will not indicate the level of the grain until the grain spills into the tube from the top. Therefore it is only when the grain reaches the level of the lip 16 that the tube 13 begins to fill and indicates that the grain has reached that level. For that reason, the sight tube 13 may be placed at approximately eye level while the lip 16 may indicate a grain level substantially higher.

Further, since the grain will not fill the sight tube 13 unless the upper tube 15 slants substantially from the horizontal, and will not empty properly through the lower tube 14 except in the same condition, it is important that these tubes do slope. I have found that an angle of approximately 45-degrees, and certainly no less than 30-degrees works well. Steeper angles than 60-degrees require more tubing than is necessary. My preference is, therefore, an angle of approximately 45 degrees from horizontal.

In order to adapt the gage to various bins, I can provide an outer tube 18 which will telescope either over or within the upper tube 15. That feature will allow some adjustment as to the actual level at which the lip 16 lies so as to provide some adjustment of the desired level of indication. A set screw 19 may be used to hold the outer tube in its adjusted position.

Although it is of less use in the present configuration, the lower tube 14 could also be used as an indication of the degree to which the bin has been emptied. Grain will not flow out of the sight tube 13 until the lower tube 14 is also free of blockage by grain in the bin so that if it should be desirable to know when the bin is emptied to a certain level, the device can be used for that purpose also. The lowest placement of the tube on the bin may be controlled by this requirement. That low placement should be at the low control level desired. Thus, as the bin is emptied, the tube 13 will remain full until the level within the bin reaches the opening in the lower tube 14. At that point, the grain will drain out of the tube leaving an empty tube 13. Thus, there is a gage of the emptying of the bin down to the lower control level.

Therefore, the gage can be used to determine when the grain in the bin reaches either an upper or a lower level. Those levels may be controlled by the length of the upper tube 15 or the lower tube 14 and their placement within the bin.

I claim as my invention:

1. For use with a bin having a near vertical side wall and being adapted to contain grain, gage means comprising an upper tube extending through said side wall, and having an open upper end within said bin, set at a level of the desired upper level of grain within said bin, said tube being formed so that said open upper end is adjustable within the bin, a lower tube also extending through said wall at a level lower than said upper tube and having an open lower end within said bin, and a transparent sight tube connecting said upper and lower tubes and adapted to be filled by said grain when the level of grain in said bin reaches said open upper end.

2. The gage means of claim 1 in which the adjustment of said upper end is accomplished by use of a telescoping tube in communication with said upper tube.

3. The gage means of claim 2 in which the lower end of said lower tube is also set at a predetermined level to gage the emptying of said bin.

4. For use with a bin having a near vertical side wall and being adapted to contain grain, gage means comprising an upper tube extending through said side wall and having an open upper end within said bin, said upper end being set at a level of the desired upper level of grain within said bin, a lower tube also extending through said side wall at a level lower than said upper tube and having an open lower end within said bin and a transparent sight tube joining said upper and lower tubes outside of said side wall and adapted to be filled with grain when the level of grain in said bin reaches said open upper end, said upper and lower tubes both being disposed at an angle of between 30 degrees and 60 degrees to the horizontal whereby flow of grain into and out of said tubes is facilitated.

5. The gage means of claim 4 in which said angle of said tubes to horizontal is approximately 45 degrees.

* * * * *